(12) United States Patent
Paveza et al.

(10) Patent No.: US 9,239,774 B2
(45) Date of Patent: Jan. 19, 2016

(54) CLASSIFICATION OF JAVASCRIPT CODE FOR DEBUGGING USING JUST MY CODE

(71) Applicant: Microsoft Corporation, Redmond, WA (US)

(72) Inventors: Robert A. Paveza, Redmond, WA (US); Patrick Nelson, Redmond, WA (US); Samuel Ng, Bellevue, WA (US); Gregg B. Miskelly, Seattle, WA (US); Gearard Boland, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/156,088

(22) Filed: Jan. 15, 2014

(65) Prior Publication Data

US 2015/0199261 A1 Jul. 16, 2015

(51) Int. Cl.
*G06F 9/44* (2006.01)
*G06F 11/36* (2006.01)

(52) U.S. Cl.
CPC .......... *G06F 11/3664* (2013.01); *G06F 11/362* (2013.01)

(58) Field of Classification Search
None
See application file for complete search history.

(56) References Cited

U.S. PATENT DOCUMENTS

| | | | |
|---|---|---|---|
| 6,061,518 A * | 5/2000 | Hoffman | 717/124 |
| 7,401,323 B2 | 7/2008 | Stall et al. | |
| 7,882,492 B2 | 2/2011 | Viswanadha et al. | |
| 8,429,613 B2 | 4/2013 | Rosen | |
| 2004/0210876 A1 * | 10/2004 | Stall et al. | 717/127 |
| 2009/0260022 A1 * | 10/2009 | Louch et al. | 719/328 |
| 2010/0153927 A1 | 6/2010 | Stall et al. | |
| 2011/0107307 A1 * | 5/2011 | Liu et al. | 717/125 |
| 2013/0311973 A1 * | 11/2013 | Rice et al. | 717/124 |
| 2014/0013306 A1 * | 1/2014 | Gounares et al. | 717/124 |
| 2014/0201709 A1 * | 7/2014 | Euerle | 717/106 |

OTHER PUBLICATIONS

"NPL_F12Debugger_BuildDate11162011Ref", Microsoft, Nov. 16, 2011.*

(Continued)

*Primary Examiner* — Don Wong
*Assistant Examiner* — Daxin Wu
(74) *Attorney, Agent, or Firm* — Kevin Sullivan; Kate Drakos; Micky Minhas (57) ABSTRACT

Just My Code debugging allows developers to work on problems within their own code without noise from libraries, plugins and other unrelated code. Typical debugger behaviors may be modified based upon the identification or characterization of JavaScript code as "My Code," "Library Code," or "Unrelated Code." The debugger behaviors that may be automatically determined using heuristics or set using a code-characterization file provided by a host application. The debugger receives project file information from the host application via a debugger-host interface. The debugger applies code-designation heuristics to undesignated code segments. If a code characterization file is received with the project information, the debugger designates application code segments based upon definitions in the code-characterization file. Once the debugger has characterized the code segments, it performs debugging operations on the application code. The behavior of the debugging operations may be selected depending upon the designation of the application code segments.

17 Claims, 3 Drawing Sheets

(56) References Cited

OTHER PUBLICATIONS

Hall, Andrew B., "Just My Code for JavaScript Windows Store Apps in Visual Studio 2013", Published on: Sep. 19, 2013, Available at: http://blogs.msdn.com/b/visualstudioalm/archive/2013/09/19/just-my-code-for-javascript-windows-store-apps-in-visual-studio-2013.aspx.

MSDN, "Just My Code", Retrieved on: Oct. 23, 2013, Available at: http://msdn.microsoft.com/en-us/library/vstudio/dn457346.aspx.

MSDN, "How to: Step Into Just My Code", Published on: Aug. 25, 2010, Available at: http://msdn.microsoft.com/en-us/library/h5e30ex%28v=vs.80%29.aspx.

Stall, Mike, "How can I debug Just My Code?", Published on: Dec. 31, 2004, Available at: http://blogs.msdn.com/b/jmstall/archive/2004/12/31/344832.aspx.

Jay, "[VS2010] On the Impacts of Debugging with "Just My Code"", Published on: Jul. 5, 2010, Available at: http://www.jaylee.org/post/2010/07/05/VS2010-On-the-Impacts-of-Debugging-with-Just-My-Code.aspx.

Apple Inc, "Safari Developer Tools Guide", Published on: Jul. 23, 2012, Available at: http://dev.bowdenweb.com/ua/browsers/safari/m/safari-developer-guide.pdf.

\* cited by examiner

CLASSIFICATION OF JAVASCRIPT CODE FOR DEBUGGING USING JUST MY CODE

BACKGROUND

A broad array of tools, such as libraries and plugins, are available for JAVASCRIPT computer programs and simplify development of JAVASCRIPT-based applications. Because these libraries have already been debugged and optimized, a JAVASCRIPT developer can usually assume that the libraries themselves do not have to be debugged. Additionally, many of these tools are compressed and minified so that the underlying code is obfuscated and made unreadable to the developer, which prevents JAVASCRIPT developers from further modifying or debugging these third-party libraries. Errors in a JAVASCRIPT developer's code may create errors within these libraries, which can cause confusion when debugging the code if the error appears to originate in the library code.

Unrelated or third-party code or content may also create errors in the developer's code. The developer generally cannot or does not want to modify the library or unrelated code. Instead, the developer is likely more interested in identifying only the errors that originate in his or her own code.

While debugging applications that use JAVASCRIPT code, different code documents may have different levels of importance to a developer who is debugging them. A typical debugger tool treats all code documents the same way, which is not always helpful to the developer who may want to focus on the code that he or she has actually written as opposed to debugging library or other third-party code.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Just My Code debugging allows developers to work on problems within their own code without noise from libraries, plugins and other unrelated code. Embodiments of the invention identify three characterizations of code: "My Code" (e.g. user-created or developer-created code), "Library Code," or "Unrelated Code." A debugger may modify its typical behaviors and responses to debugging gestures and execution experiences based upon the code characterization. The debugger may make automated determinations regarding how a source document maps to the code characterizations in the application being debugged.

In one embodiment, systems and methods for debugging code establish an interface between a debugger application and a host application. The host supports a script engine and one or more project files for the application being debugged. The project files identifying source documents for application code. The debugger receives project file information at the debugger via the interface. The debugger then applies code-designation heuristics to the project file information to designate segments of the application code in the project files as one of developer code, library code, and unrelated code. The debugger then performs debugging operations on the application code. The behaviors of the debugging operations are selected depending upon the designation of the application code segments.

In another embodiment, the debugger may additionally or alternatively receive a code-characterization file with the project file information. The debugger first designates characterizations for application code segments as defined in the code-characterization file and then applies the code-designation heuristics to designate application code segments that are not addressed by the code-characterization file.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
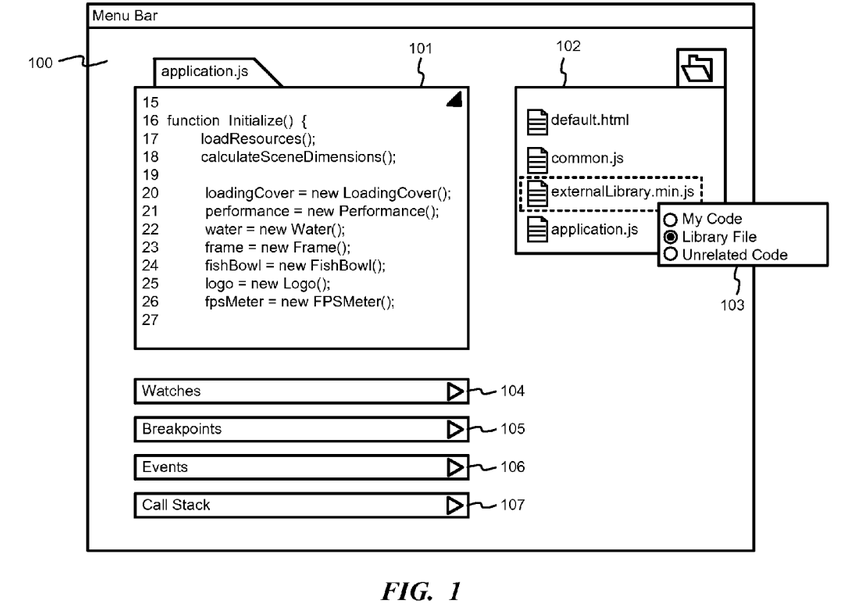
FIG. 1 illustrates a user interface for a debugger tool or integrated development environment application according to an example embodiment.

FIG. 1 illustrates a user interface 100 for a debugger tool or integrated development environment (IDE) application according to an example embodiment. User interface 100 allows developers to select code for debugging and to identify whether the code was created by the developer—i.e., "My Code"—or was from an outside source.

A code window 101 shows lines of code for a selected source file, such as a JAVASCRIPT document. A source documents window 102 shows files that are available for debugging. A developer may select one of the source files using a pointing device, such as a mouse or touch pad, or using menu commands. These files may be code written by the developer, such as the application.js example code shown in code window 101. Libraries, plug-ins and other external files that are being used by the developer, but that were not created by the developer, can also be shown in window 102. For example, rather than recreating an existing feature, the developer may obtain an open-source document with code for that feature and use the open-source document in a new application.

The developer may select files in source documents window 102 and open a code designation window 103, such as by "right-clicking" with a mouse or using menu commands. The developer may designate the selected code as the developer's own code (i.e., "My Code"), as a library file ("Library Code"), or as unrelated code ("Unrelated Code") by selecting the appropriate option. The file designation is used by the debugger tool or IDE to determine whether to land on or display errors in code for that file.

User interface 100 also provides the developer with other configuration options, such as the ability to set watches, 104, breakpoints 105, or events 106 for the debugger tool. The developer may also view the call stack 107 for selected code.

Figure 2:
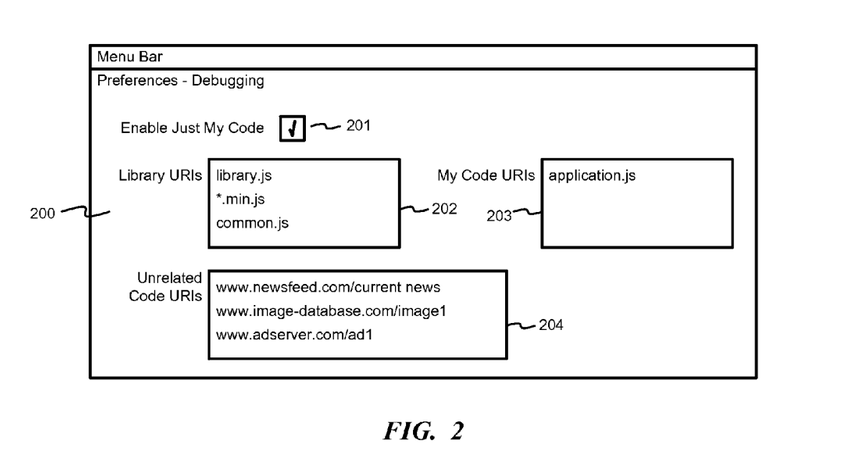
FIG. 2 illustrates a user interface for selecting developer preferences when debugging with a just-my-code feature.

FIG. 2 illustrates a user interface 200 for selecting developer preferences when debugging with a Just My Code feature. The developer may select to limit debugging to files designated as "My Code" using a checkbox 201 or other feature. The developer may designate URIs in window 202 for the debugger tool or IDE to use when identifying "Library Code." A My Code URI window 203 can be used by the developer to specify files that should be considered as "My Code" by the debugger.

User interface 200 allows users to specifically select documents and files that will be considered to be library files (202) and marked as "Library Code," or that will be marked as "My Code" (203), or that will be marked as "Unrelated Code" (204). The files can also be marked by wildcard matching or heuristics. For example, a particular file library.js is specifically designated as a library file, and using the wildcard *.min.js every JAVASCRIPT computer program that has been minified script is also considered to be a library file and would be opted out of "My Code." Unrelated code 204 may include, for example, information provided by external sources, such as a newsfeed, image database, advertisements, or other sources of information displayed in or used by the developer's application.

During debugging of their user script code a developer often inserts breakpoints where they can inspect the test environment to determine whether it is functioning as expected. At the breakpoints, the developer may inspect variables, step to different functions without executing the code in between, edit code and continue execution, review exception handling, etc. When the debugger hits a breakpoint in the debuggee application, the debuggee freezes until execution is restarted by the developer. However, the developer may not want to halt the application within library or open source code because that library or open source code is likely to have been debugged already and, therefore, is likely not the cause of errors in the debuggee application. Instead, the developer wants to see the proximate cause of errors, which likely falls within the developers own code ("My Code").

Rather than requiring the developer to navigate manually to his or her own code that is causing an error, a debugger using a Just My Code feature will automatically skip over the library and open source code. When the debugger tool encounters an exception that would normally trigger a halt, the debugger evaluate whether the source file constitutes "My Code." If it does not, the debugger will scan the execution stack for the most recent document on the execution stack that match a "My Code" URI. Once the debugger finds a "My Code" document, it will highlight the relevant line in the debugger (102). If no "My Code" document is found, the document in which the exception occurred may be shown or optionally, the exception may be completely ignored. All other debugger features will behave in the typical way. The debugger will generally not show source code for the library or open source files; however, developers may also opt to inspect "not my code" files by navigating the call stack (107), for example.

Figure 3:
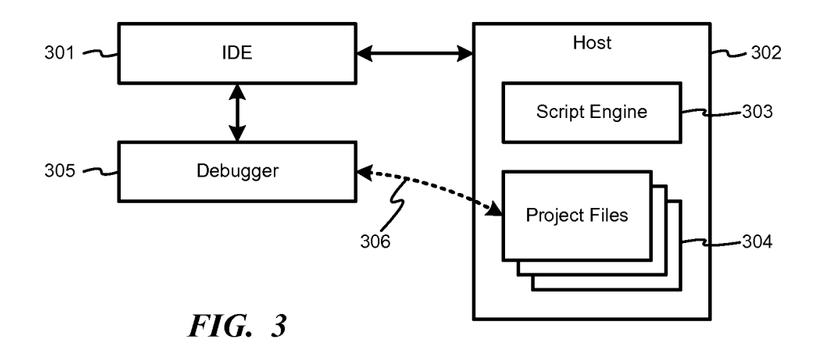
FIG. 3 is a block diagram of a development environment according to one embodiment.

FIG. 3 is a block diagram of a development environment according to one embodiment. Integrated Development Environment (IDE) application 301 provides an interface to a local or remote host 302 with a script engine 303. IDE 301 is used to author scripts to be executed by script engine 303. The scripts may be stored in project files 304, which may also include libraries, plugins, and other code. Project files 304 include specific knowledge about the scripts written by a developer.

IDE 301 provides an interface to debugger 305, which is used by the developer to debug scripts. Project files 304 and scripts are generally separate from debugger 305, but IDE 301 brokers a relationship—debugger-host interface 306—between them so that the developer may analyze his or her code. Debugger 305 monitors and controls the experience of the application being debugged.

In order to be generalizable, debugger 305 typically does not have specific knowledge about the scripts or application being debugged. In some cases, specialized debuggers may have specific knowledge (for example, browser debugging tools may have specialized web application knowledge); however, this is typically not knowledge about the specific documents that are important to the developer using the debugger. Embodiments of the invention provide a channel 306 by which the debugger and host may communicate. The host 302 may provide varying debugging behaviors based on heuristics associated with the scripts and project files 304. Because host 302 may have special knowledge about the source documents being debugged, the host can provide accurate information to the debugger 305. For example, the host may know whether the documents being debugged have a relationship to other documents or other code.

Debugger-Host Interface

The debugger is a software component that can be hosted within one or more applications. The debugger has a defined interface and set of operations that it supports. A debugger typically does not have semantic details about the project that it is debugging. For example, a script debugger may not know about the documents being debugged, such as the names or source locations for the documents. However, by leveraging the information that is available about the documents from the script engine's host and by establishing a communication channel between the host and the debugger, the host can provide contextual information about the script document being debugged.

An application may be built using certain rules. For example, in one scenario, it may be required that an application's executable code is contained within the application's package. If code outside the package is called, that code may be permitted to execute, but only in a sandboxed manner that does not permit the code to modify local system state. In another scenario that is common with e-reader applications, such as those that display a web page (such as in a news aggregator), the referenced content is not actually part of the application. As such, the application's author may not have control over the web page content. Because the hosted content is not trusted, that code is not privileged to perform operations on the user's data, such as accessing documents.

The debugger does not have specific domain knowledge about these rules. Instead, the host application needs to provide that information. The example implementation described herein queries the project being debugged for a particular interface. This interface uses information about the files and structure of the project to make a determination about the status of the document being debugged.

When the debugger is not hosted within an environment having a project system that can provide the debugger-host interface, such an interface can be inferred using a rules file.

The state or characterization of code (i.e., as "My Code," "Library Code," or "Unrelated Code") may be determined based upon location of the source document. In addition to this baseline, location-based mechanism of determining the state of the code, the debugger may be aware of a file-mapping mechanism for transformatively-compiled programming languages. In this scenario, if the debugger is aware that a particular source region of script code actually maps to a different source region in a different document, the debugger may actually query for the original source document instead of the script file being debugged.

Mechanism for Determining Whether Code is "My Code"

Debuggers for native code or managed code programming languages typically have two states for classifying code. Either symbols are available, which indicates that the code is "My Code," or no symbols are available, which indicates that the code is "Not My Code." Symbols are details about the physical structure of the program when it is being executed, which allow a debugger to map the source code authored by the programmer to the state of the program as it is executed by the computer. In order to create a productive debugging experience, this dual-state scenario is inadequate for script. The script code can come from many sources, and the source documents are always available to the debugger (i.e., without the script source, the script itself could not execute).

Embodiments of the script debugger characterize code into three levels: "My Code," "Library Code," and "Unrelated Code." Code determined to be "My Code" is treated with the full range of expected debugger features, as if a Just My Code implementation was not part of the system. "Library Code" is code that was not authored by the developer who is using it, but was intentionally incorporated into the program by the developer. For example, developers often use a programming library that facilitates common programming operations. "Unrelated Code" is code that is brought into the program without deliberate intent by the programmer, such as code that executes from a news website that the program's author did not create.

The following heuristics may be used to determine how to characterize code during debugging.

If the application being debugged is an application (as opposed to a web site), and the source document location is a web-based Uniform Resource Locator (URL) (such as one that travels over HTTP, HTTPS, SPDY, etc.), then the code is characterized as "Unrelated Code."

If the code is dynamic (for example, created via the eval( ) special function or Function( ) constructor in JAVASCRIPT computer programs), the debugger determines the state of the code's parent document. If the state of the parent document is Unrelated Code, then the code being debugged is characterized as "Unrelated Code." Otherwise, the code begin debugged is characterized as "Library Code."

If the code is minified, then it is characterized as "Library Code." Minified code may be detected by the presence of the common ".min" token in the file name. Alternatively, the contents of the file may be examined and the line lengths compared to the total number of lines. Minified code may be detected when the ratio of line lengths to lines is unusually high.

If the code is contained within a special "reference" with respect to the project's dependencies, then it is characterized as "Library Code."

If the code was added to the project via a package manager, then it is characterized as "Library Code."

If the code does not meet the criteria above, it is characterized as "My Code."

In addition to these heuristics, a code-characterization file can be used to override these rules. The code-characterization file may include a source map for the application code to identify a more authoritative source file than the specific document being debugged. The code-characterization file may use a wildcard expansion mechanism to allow developers to specify precisely which of these three categories ("My Code," "Library Code," and "Unrelated Code") best fits the script document in question. Prior to evaluating these heuristics, the control mechanism checks for the presence of the code-characterization file. If found, the debugger uses the code-characterization file to evaluate the code.

If more than one match for the code is found in the code-characterization file, then the most permissive match is selected. For example, the designation "My Code" is more permissive than "Library Code," which is more permissive than "Unrelated Code." Using a most-permissive match causes the system to tend toward showing the debugger user more code. Alternatively, the user may have the option of selecting a least-permissive match, which would tend to be more restrictive in what is labeled as "My Code." If no match is found in the code-characterization file, then heuristics such as those described above may be applied to characterize or identify code segments.

Figure 4:
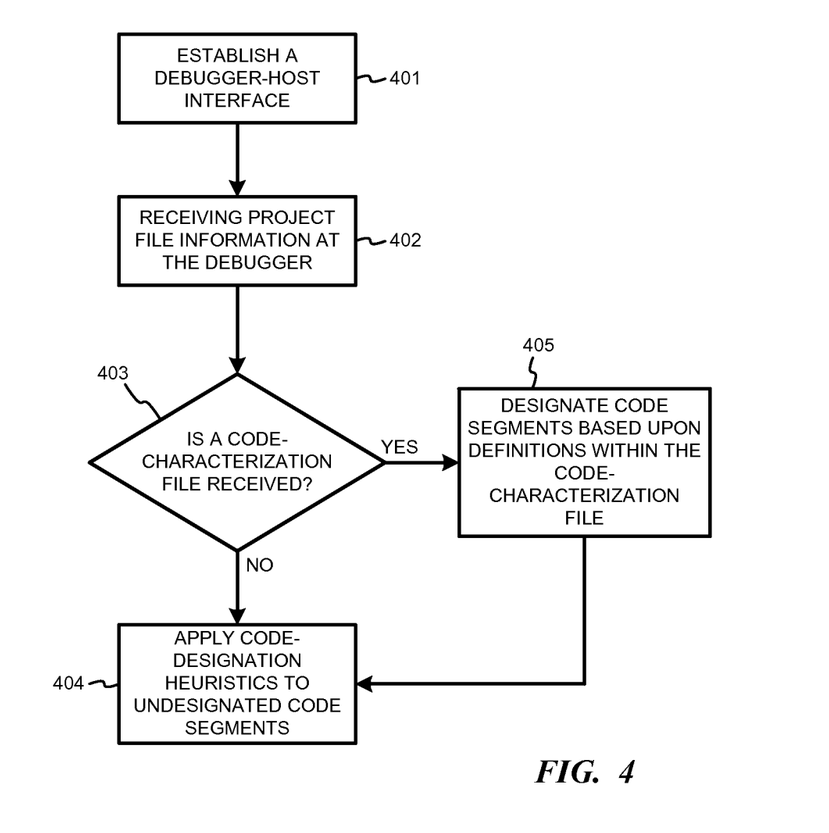
FIG. 4 is a flowchart illustrating a method for characterizing segments of application code according to one embodiment.

FIG. 4 is a flowchart illustrating a method for characterizing segments of application code according to one embodiment. In step 401, an interface is established between a debugger application and a host application. The host supports a script engine and one or more project files for an application being debugged. The project files identify source documents for application code. In step 402, the debugger receives project file information from the host application via the interface. In step 403, the debugger determines if a code-characterization file is received with the project file information.

If a code characterization file is not received, then the process moves to step 404 where the debugger applies code-designation heuristics to undesignated code segments. The code-designation heuristics may include, for example:
- designating as "Unrelated Code" any application code segments associated with source documents having a web-based Uniform Resource Locator (URL) a location;
- designating as "Unrelated Code" any dynamic application code segments having a parent document with a code designation of "Unrelated Code;"
- designating as "Library Code" any dynamic application code segments having a parent document with a code designation that is other than "Unrelated Code;"
- designating as "Library Code" any minified application code segment;
- designating as "Library Code" any application code segment that is contained within a reference; and
- designating as "Library Code" any application code segment that was added via a package manager.

Any code that does not get designated using the heuristics is assigned a "My Code" designation.

If a code-characterization file is received with the project file information, then the process moves to step 405 in which the debugger designates application code segments as one of "My Code," "Library Code," and "Unrelated Code" based upon definitions in the code-characterization file. The process then moves to step 404 to identify designations for any remaining undesignated code segments.

Once the debugger has characterized the code segments, it performs debugging operations on the application code. The behavior of the debugging operations may be selected depending upon the designation of the application code segments.

Figure 5:
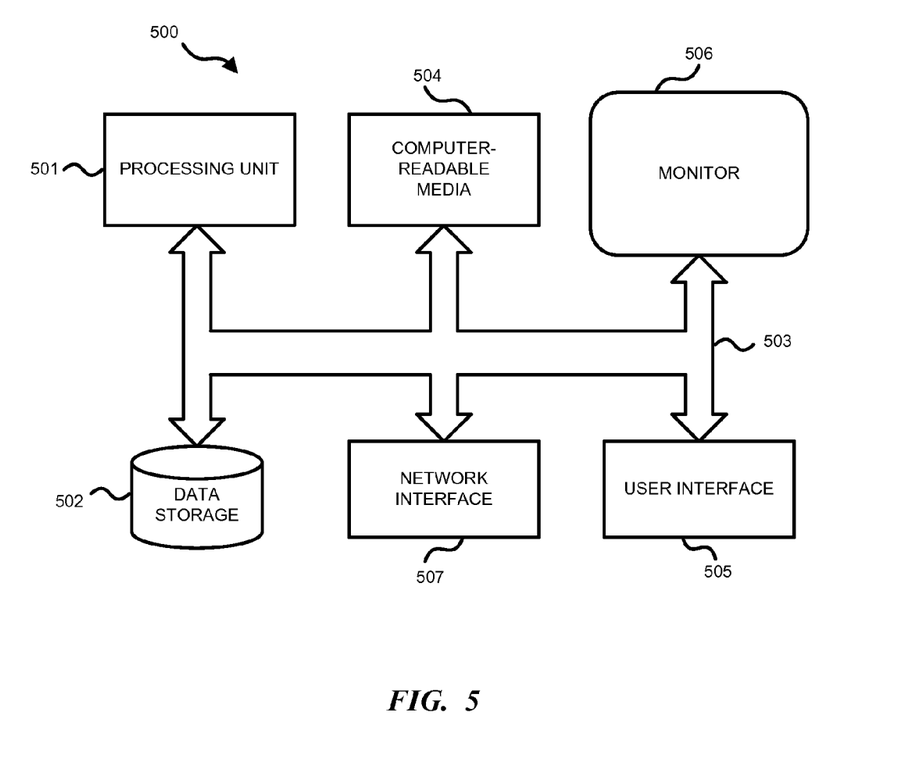
FIG. 5 illustrates an example of a suitable computing and networking environment for designating code segments using a Just My Code feature in a debugger.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Processing unit 501 may run developer and debugging tools, such as an IDE, JAVASCRIPT editor, or browser, for implementing aspects of the invention described herein.

The computer 500 typically includes a variety of computer-readable media 504. Computer-readable media 504 may be any available media that can be accessed by the computer 500 and includes both volatile and nonvolatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

Data storage 502 and computer-readable media 504 may hold software applications for developing and debugging JAVASCRIPT applications, such as an IDE, JAVASCRIPT editor or browser. Additionally, data storage 502 and computer-readable media 504 may hold JAVASCRIPT files, such as developer generated code (i.e., "my code") and library, open source, third-party, and other code (i.e., "not my code"). Files in other programming languages, such as TypeScript, CoffeeScript, or Dart, may also be stored.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). User interface 505 may provide a developer with tools for identifying sections of JAVASCRIPT code as "my code" or "not my code."

A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

Network interface 507 may also be used to provide access to software and code running on a remote computer or terminal so that a developer using system 500 can debug the code running on the remote device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for debugging JavaScript code and other code that is compiled into JavaScript in a computer system, the method comprising:
    establishing an interface between a debugger application and a host application, the host supporting a script engine and one or more project files for an application being debugged, the project files identifying source documents for application code;
    receiving project file information at the debugger via the interface;
    applying code-designation heuristics to the project file information to designate segments of the application code in the project files as one of developer code, library code, and unrelated code
    determining a code designation for a parent document associated with application code segment;
    if the parent document code designation is unrelated code, then designating the application code segment as unrelated code; and
    if the parent document code designation is other than unrelated code, then designating the application code segment as library code.

2. The method of claim 1, further comprising:
    performing debugging operations on the application code, wherein a behavior of the debugging operations is selected depending upon the designation of the application code segments.

3. The method of claim 1, wherein the code-designation heuristics comprise:
    determining whether the application is other than a website;
    determining if a location for a selected source document is a web-based Uniform Resource Locator (URL); and
    designating an application code segment associated with the selected source document as unrelated code.

4. The method of claim 1, wherein the code-designation heuristics comprise:
    determining whether an application code segment is minified;
    designating the application code segment as library code.

5. The method of claim 1, wherein the code-designation heuristics comprise:
    determining whether an application code segment is contained within a reference;
    designating the application code segment as library code.

6. The method of claim 1, wherein the code-designation heuristics comprise:
    determining whether an application code segment was added via a package manager;
    designating the application code segment as library code.

7. The method of claim 1, further comprising:
    receiving a code-characterization file with the project file information;
    designating characterizations for application code segments as defined in the code-characterization file; and
    applying the code-designation heuristics to designate application code segments that are not addressed by the code-characterization file.

8. A computer system comprising one or more hardware processors running a debugger application and a host application, the host application supporting a script engine and one or more project files for an application being debugged, the debugger application configured to perform one or more debugging operations, the debugger application operating to: receive project file information at the debugger application via an interface between the debugger application and the host application, the project files identifying source documents for application code; apply code-designation heuristics to the project file information to designate segments of the application code in the project files as one of developer code, library code, and unrelated code; determining a code designation for a parent document associated with application code segment; if the parent document code designation is unrelated code, then designating the application code segment as unrelated code; and if the parent document code designation is other than unrelated code, then designating the application code segment as library code.

9. The computer system of claim 8, the debugger application further operating to: perform debugging operations on the application code, wherein a behavior of the debugging operations is selected depending upon the designation of the application code segments.

10. The computer system of claim 8, wherein the code-designation heuristics comprise:
    determining whether the application is other than a website;
    determining if a location for a selected source document is a web-based Uniform Resource Locator (URL); and designating an application code segment associated with the selected source document as unrelated code.

11. The computer system of claim 8, wherein the code-designation heuristics comprise: determining whether an application code segment is minified;
designating the application code segment as library code.

12. The computer system of claim 8, wherein the code-designation heuristics comprise:
determining whether an application code segment is contained within a reference;
designating the application code segment as library code.

13. The computer system of claim 8, wherein the code-designation heuristics comprise:
determining whether an application code segment was added via a package manager;
designating the application code segment as library code.

14. The computer system of claim 8, the debugger application further operating to:
receive a code-characterization file with the project file information;
designate characterizations for application code segments as defined in the code-characterization file; and
apply the code-designation heuristics to designate application code segments that are not addressed by the code-characterization file.

15. A computer-readable storage hardware device storing computer-executable instructions that when executed by at least one processor cause the at least one processor to perform a method for characterizing segments of application code, the method comprising:
establishing an interface between a debugger application and a host application, the host supporting a script engine and one or more project files for an application being debugged, the project files identifying source documents for application code; receiving project file information at the debugger via the interface; receiving a code-characterization file with the project file information; designating application code segments as one of developer code, library code, and unrelated code based upon definitions in the code-characterization file; and applying code-designation heuristics to the project file information to designate application code segments that are not addressed by the code-characterization file as one of developer code, library code, and unrelated code:
wherein the code-designation heuristics comprise:
designating as unrelated code any dynamic application code segments having a parent document with a code designation of unrelated code; and designating as library code any dynamic application code segments having a parent document with a code designation that is other than unrelated code.

16. The computer-readable storage hardware device of claim 15, further comprising:
performing debugging operations on the application code, wherein a behavior of the debugging operations is selected depending upon the designation of the application code segments.

17. The computer-readable storage hardware device of claim 15, wherein the-code-designation heuristics further comprise one or more of:
designating as unrelated code any application code segments associated with source documents having a web-based Uniform Resource Locator (URL) a location; designating as library code any minified application code segment; designating as library code any application code segment that is contained within a reference; and designating as library code any application code segment that was added via a package manager.

* * * * *